US009052854B2

(12) United States Patent
Klassen et al.

(10) Patent No.: US 9,052,854 B2
(45) Date of Patent: *Jun. 9, 2015

(54) PARALLEL PRINTING SYSTEM

(75) Inventors: R. Victor Klassen, Harrisonburg, VA (US); James M. Sweet, Rochester, NY (US); Stephen C. Morgana, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/435,412

(22) Filed: Mar. 30, 2012

(65) Prior Publication Data

US 2013/0258374 A1  Oct. 3, 2013

(51) Int. Cl.
*G06F 3/12* (2006.01)
*G06K 15/02* (2006.01)

(52) U.S. Cl.
CPC ........... *G06F 3/1211* (2013.01); *G06F 3/124* (2013.01); *G06K 15/02* (2013.01)

(58) Field of Classification Search
CPC ..... G06F 3/1285; G06F 3/124; G06F 3/1212; G06F 3/1206; G06F 3/1213; G06F 3/1211; G06K 15/02
USPC ........ 358/1.1, 1.11–1.18, 400–404, 537–540, 358/448, 449, 452, 453, 462; 709/201–203, 709/217–219; 718/1, 100–108; 382/276, 382/302–307; 711/100, 113, 118–132, 147, 711/159, 160
See application file for complete search history.

(56) References Cited

U.S. PATENT DOCUMENTS

| | | | |
|---|---|---|---|
| 6,441,919 B1* | 8/2002 | Parker et al. | 358/1.18 |
| 6,817,791 B2 | 11/2004 | Klassen | |
| 7,161,705 B2 | 1/2007 | Klassen | |
| 7,532,355 B2* | 5/2009 | Gauthier et al. | 358/1.18 |
| 7,872,767 B2 | 1/2011 | Klassen | |
| 2001/0050781 A1* | 12/2001 | Kujirai | 358/1.15 |
| 2003/0086098 A1* | 5/2003 | Sesek et al. | 358/1.1 |
| 2004/0196497 A1 | 10/2004 | Klassen et al. | |
| 2009/0080025 A1* | 3/2009 | Aronshtam et al. | 358/1.17 |
| 2009/0161163 A1* | 6/2009 | Klassen et al. | 358/1.18 |
| 2010/0290080 A1 | 11/2010 | Klassen | |
| 2011/0222091 A1* | 9/2011 | Ward et al. | 358/1.13 |

OTHER PUBLICATIONS

"Postscript Language Document Structuring Conventions Specification". Version 3.0. Sep. 25, 1992. Adobe Systems Inc. pp. 8-16.*

* cited by examiner

*Primary Examiner* — Chad Dickerson
(74) *Attorney, Agent, or Firm* — Pillsbury Winthrop Shaw Pittman, LLP

(57) ABSTRACT

A parallel Raster Image Processor system that includes a plurality of Raster Image Processors (RIPs) for parallel processing of a print job into a printer-ready format for the printing of the print job and a splitter for splitting the print job into a plurality of chunks and sending the chunks of the job to the plurality of the RIPs for processing. The print job includes objects described in a page description language. The splitter is configured to: interpret the job to determine the objects required by each of the plurality of the RIPs to process corresponding received chunks; store the determined objects to maintain knowledge of the determined objects; and send the determined objects along with the corresponding chunks to the designated RIPs to process the corresponding chunks, if the same determined objects are not already with the designated RIPs.

20 Claims, 3 Drawing Sheets

PARALLEL PRINTING SYSTEM

CROSS REFERENCE TO RELATED APPLICATION

The following co-pending application, U.S. patent application Ser. No. 13/435,469, entitled "Parallel Printing System", is assigned to the same assignee of the present application. The entire disclosure of this co-pending application is incorporated herein by reference in its entirety.

BACKGROUND

1. Field

The present disclosure relates to a system and a method of operating a printing system for parallel processing of a print job with a plurality of Raster Image Processors (RIPs) into a printer-ready format for the printing of the print job.

2. Description of Related Art

Generating print-ready documents to be printed by the printing system requires acquiring all the information (e.g., content, graphics, production specifications, etc.) required to view, process and output the desired document in an electronic format understandable by a print engine. Such systems range from those that are simple and modestly expensive, such as are well known to consumer users of personal computer systems, up to commercial printing systems that are capable of generating in the range of one thousand pages per minute in full color. All systems though have a high level objective of printing faster.

The process of converting information in the form of graphics, fonts and character placement information, and pictorial image content into a print-ready form, generally a raster image, possibly compressed or encoded in some way, is commonly known as Raster Image Processing (RIPping), and performed by what is called a Raster Image Processor (RIP). In any printing system, the speed is limited by the speed of the printer itself, (which is independent of the document complexity), and the speed of the RIP (which generally depends on the document, and may also depend on properties of the printer, such as its resolution, and its ability to support color), whichever is slower. The present application includes an embodiment that is directed at accelerating the RIP.

There are three general approaches that have been applied in the past for accomplishing the objective of printing faster. First, faster serial processing methods suggest optimizing the software and using faster and more expensive processors. Second, job parallel processing sends separate jobs to separate systems and then prints them on a common printer. Third, Portable Document Format ("PDF") based page parallel systems convert the job to PDF, and then split the PDF file into pages which are converted to print-ready format on multiple independent processors, with the job being printed on a common printer.

Software optimization has its limitations and faster processors are also limited by currently available technology. Job parallel processing results in poor single job performance, unpredictable job time and reduced throughput when there is only one long job in the queue. The existing PDF-based solutions are slow due to their need to often convert from a different input language into PDF and then write the PDF file into an input spool disk. Page parallel processing has suffered from the inefficiencies of a throughput disadvantage because per job overhead occurs on a per page basis.

Accordingly, in the continuing need for improving efficiency and speed in printing systems, there is a need for a system which is not limited to mere job parallelism or page parallelism and that facilitates control and data flow of a print job to the printing system while splitting the print job into a plurality of print job portions, each of which is processed independently and in parallel. The splitting operation is generally performed by a splitter in the printing system. How a print job can be better split while ensuring page parallelism or chunk parallelism is a subject of this present disclosure.

Presently used splitters either operate on documents in a PDF format or rely on conformance to Document Structuring Conventions (DSC) to split.

Documents that do not conform to the DSC comments (e.g., the majority of Variable Data Intelligent Postscript Printware (VIPP) documents, and a minority of PostScript documents) either may be converted to PDF in order to be split or must be processed in serial. For example, some jobs that lack the DSC comments are currently processed in serial, and therefore such jobs are slow to print. In some printing systems, the speed ratio between serial and parallel processing could be a factor of 20-40, or even higher.

Among the documents that do not conform to the DSC comments are a majority of Variable Data Intelligent Postscript Printware (VIPP) documents. VIPP database mode is one of three modes of VIPP. Many, but not all, VIPP jobs use this mode, in which a small file containing a small amount of preamble information, and a series of records, typically small, is used along with PostScript procedures to construct the page content using additional files as a database. VIPP is a collection of PostScript procedures, which induce the PostScript interpreter to not only convert page descriptions to print-ready format but also create those page descriptions from a simple set of instructions along with a database. One record typically corresponds to one document to be sent to one customer. It could be the information needed to construct one billing statement, or it could be the information needed to construct a personalized catalogue. The currently used parallel Raster Image Processor (RIP) system splits VIPP database mode jobs at record boundaries. Normally records correspond to only a few pages, but they may run into hundreds of pages. Jobs may not be optimally split at record boundaries, especially in the case where records run into many pages. For this reason, and because other modes of VIPP are not amenable to splitting in this fashion, a splitter that understands PostScript is to be desired.

In the current parallel RIP system, a PostScript document is split by relying on the DSC comments. As a complete programming language (i.e., rather than a description language), Postscript includes variables, loops and many other common programming language structures. One problem that is often encountered is renaming of actual Postscript commands and/or the substitution of one action/command by another. This operator overload may be used for efficiency (as in VIPP jobs), for brevity, for simply replacing many commands with a single one, or for any other reason (e.g., obfuscation). A disadvantage of this is that no processing of the Postscript data may be done without actually executing the entire program, which is a time-consuming process. Applicants of the present disclosure, in one embodiment, propose a method and system to execute the program without performing the action/commands so as to circumvent the operator overload while maintaining efficiency.

SUMMARY

According to one aspect of the present disclosure, a parallel Raster Image Processor system is provided. The system includes a plurality of Raster Image Processors (RIPs) for parallel processing of a print job into a printer-ready format for the printing of the print job, and a splitter for splitting the print job into a plurality of chunks and sending the chunks of the job to the plurality of the RIPs for processing. The print job includes objects described in a page description language. The splitter is configured to: interpret the job to determine the objects required by each of the plurality of the RIPs to process corresponding received chunks; store the determined objects to maintain knowledge of the determined objects; and send the determined objects along with the corresponding chunks to the designated RIPs to process the corresponding chunks, if the same determined objects are not already with the designated RIPs.

According to another aspect of the present disclosure, a method of operating a printing system for parallel processing of a print job with a plurality of Raster Image Processors (RIPs) into a printer-ready format for the printing of the print job is provided. The method includes splitting the print job into a plurality of chunks and sending the chunks of the job to the plurality of the RIPs for processing, the print job includes objects described in a page description language; interpreting the job to determine the objects required by each of the plurality of the RIPs to process corresponding received chunks; storing the determined objects to maintain knowledge of the determined objects; and sending the determined objects along with the corresponding chunks to the designated RIPs to process the corresponding chunks, if the same determined objects are not already with the designated RIPs.

According to another aspect of the present disclosure, a splitter for splitting a print job into a plurality of chunks is provided. The print job includes objects described in a page language description language. The splitter is configured to: interpret the job to determine the objects required by each of a plurality of RIPs to process corresponding chunks; store the determined objects to maintain knowledge of the determined objects; and send the determined objects along with the corresponding chunks to designated RIPs to process the corresponding chunks, if the same determined objects are not already with the designated RIPs.

Other objects, features, and advantages of one or more embodiments of the present disclosure will seem apparent from the following detailed description, and accompanying drawings, and the appended claims.

BRIEF DESCRIPTION OF THE DRAWINGS

Various embodiments will now be disclosed, by way of example only, with reference to the accompanying schematic drawings in which corresponding reference symbols indicate corresponding parts, in which.

DETAILED DESCRIPTION

The present disclosure includes an implementation of parallel document processing, which is referred to as "chunk" parallelism. Chunk parallelism is an intermediate level of parallelism between job parallelism and page parallelism. In a "chunk" processing system, an individual job is taken from a queue and broken down into pages or other divisible "chunks," with the chunks being sent to multiple RIP processors to be converted in parallel so that individual pages or "chunks" can be output in logical page order (e.g., chunks 1, 2, 3).

A chunk is a collection of rasterized data consisting of at least one page and not more than one job. Job parallelism occurs when a job is smaller than the minimum chunk size, while page parallelism occurs when the minimum chunk size is 0 (bytes/pages). A chunk may be an integer number of pages less than an entire job but has a startup overhead occurring on a chunk basis as opposed to a per page basis.

Figure 2:
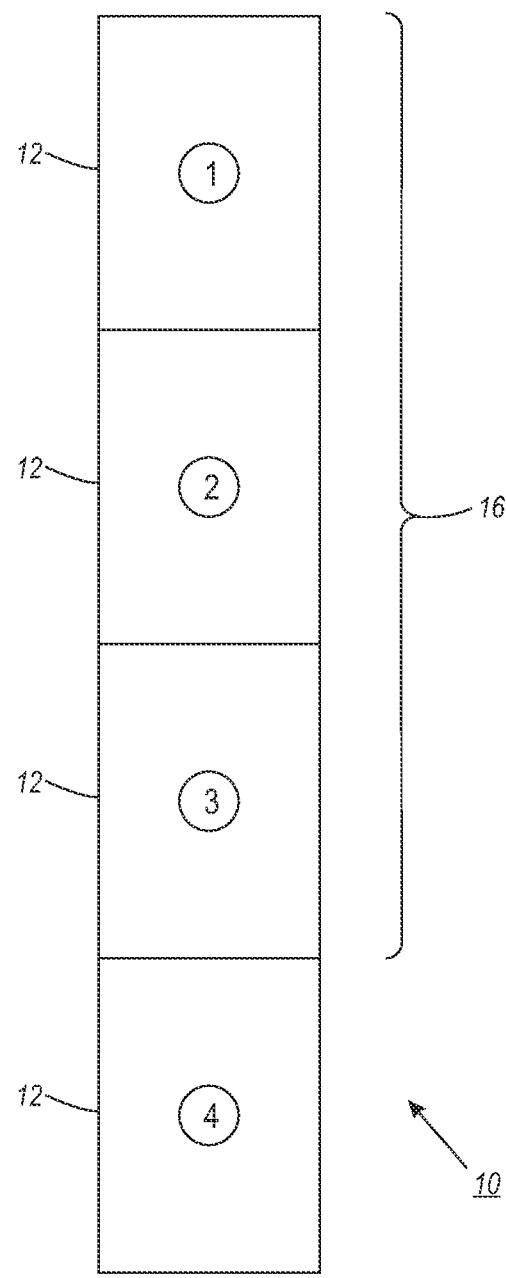
FIG. 2 is a schematic representation of a print job for showing page and possible chunk boundaries.

For example, referring to FIG. 2, a particular print job 10 may include multiple pages 12 and several of the pages 12 are associated together into a "chunk" 16 for rasterizing by an assigned RIP node. Chunk parallelism is described in detail, for example, in U.S. Pat. No. 7,872,767, titled "Parallel Printing System," which is incorporated herein by reference in its entirety.

Figure 1:
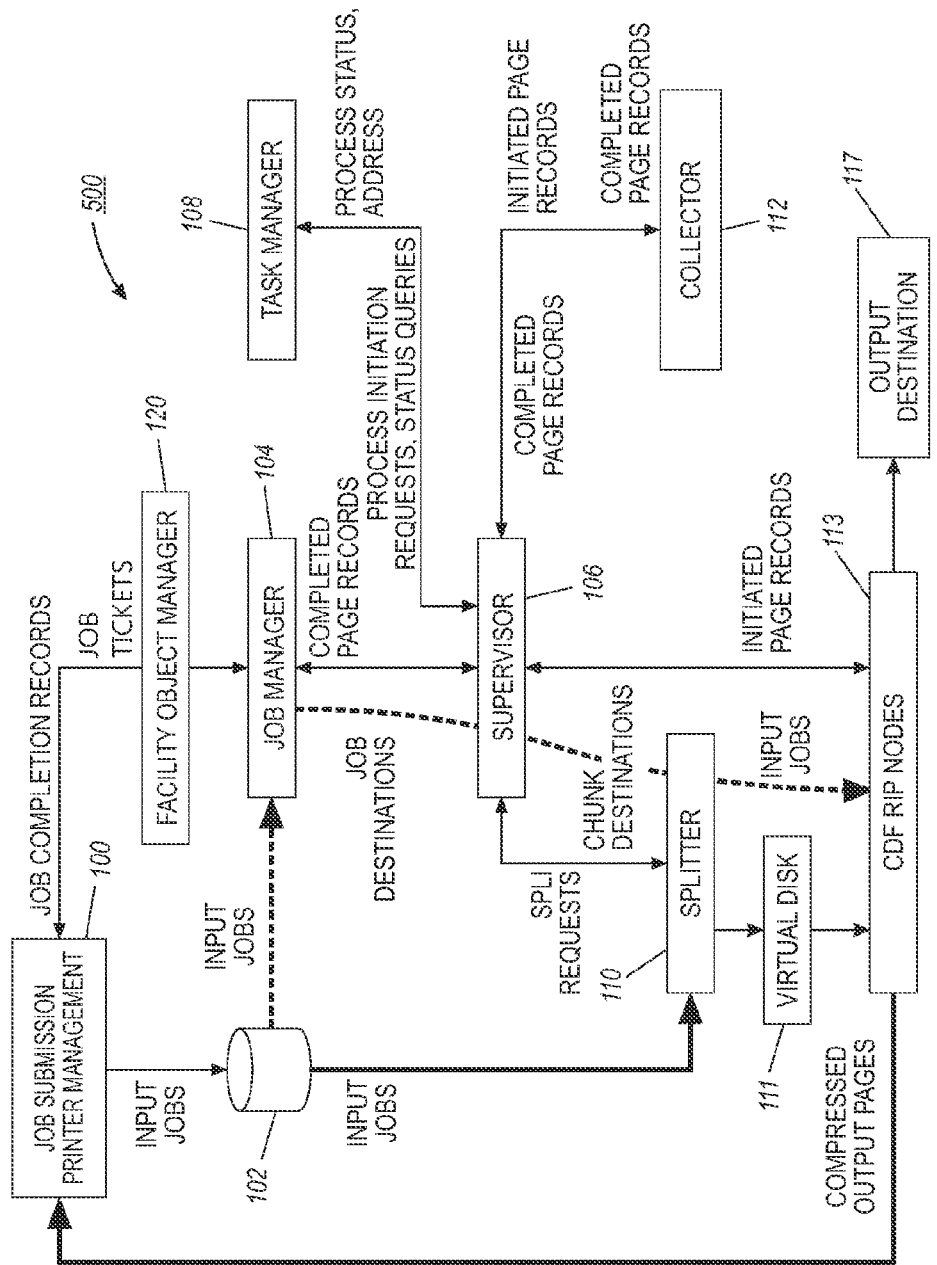
FIG. 1 is a block diagram illustrating the architecture for control and data flow of an image printing system formed in accordance with an embodiment of the present disclosure.
Figure 3:
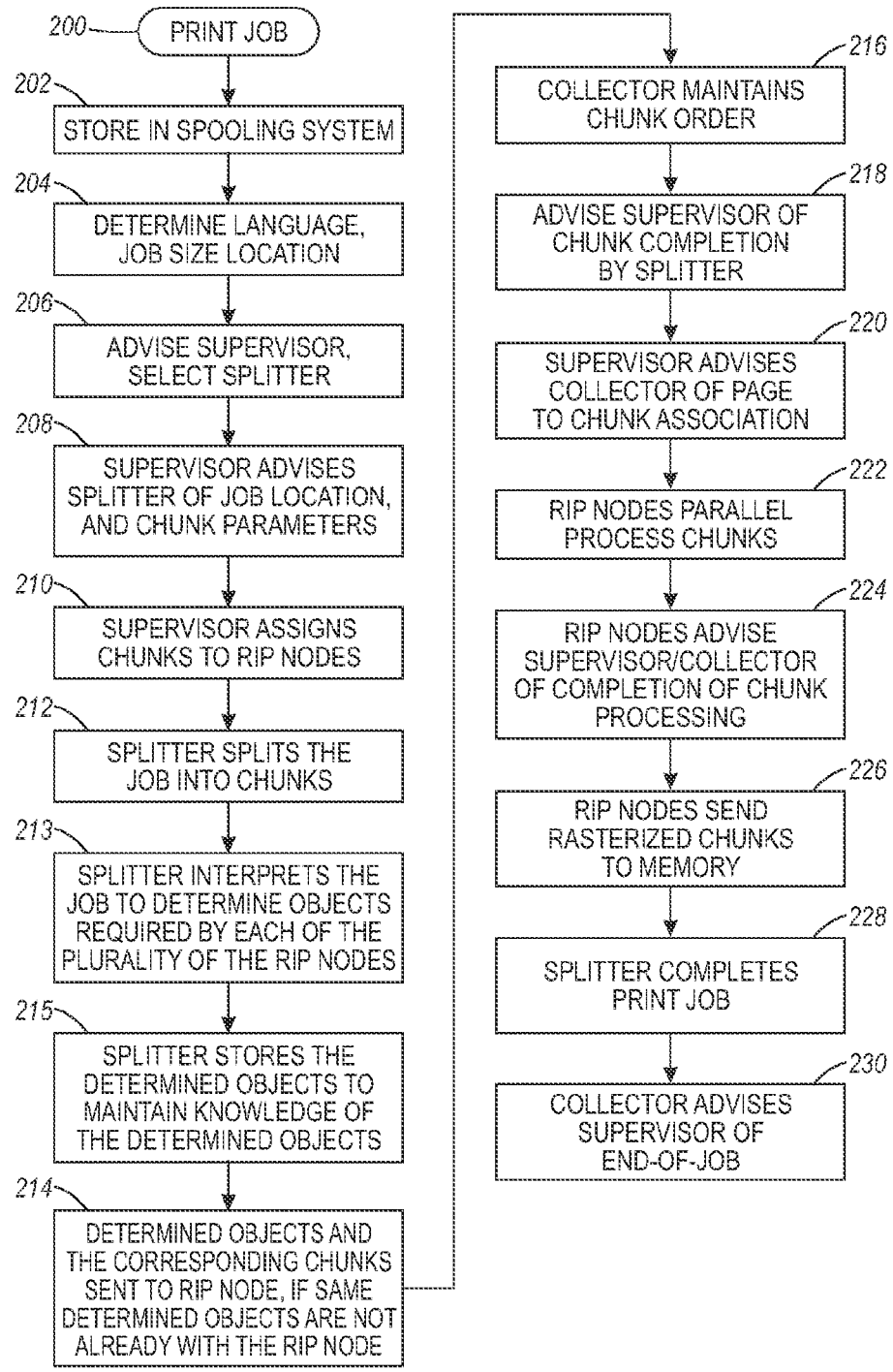
FIG. 3 is a flowchart summarizing a method for processing a print job in accordance with an embodiment of the present disclosure.

FIG. 1 shows a parallel RIP system 500 and FIG. 3 is a flowchart summarizing a method for processing a print job in accordance with an embodiment of the present disclosure. The system may be implemented as a distributed system, or a centralized service on a single multiprocessor machine, for driving a print engine (not shown).

In general, the system 500 operates by breaking incoming job(s) into chunks, where a chunk is a stream of data in the same language as the input print job, containing all of the data required to describe an integer number of pages in the print job. For example, the incoming jobs may include PostScript documents or a restricted subset of VIPP jobs. A device or module in the system 500 responsible for breaking the incoming job into chunks is known as a "splitter" 110. The splitter 110 reads its input (i.e., incoming job) either from an input spool disk 102 or directly from an incoming stream, for indefinite length jobs. The splitter 110 then splits the incoming job into chunks, writes its output data to a virtual disk 111, and notifies a supervisor 106 it has done so. The supervisor 106 notifies the target RIP that there is new work for it to do, and the RIP converts the input stream, in any input language, into a print-ready format.

Details of the operation of the parallel RIP system may be found in U.S. Pat. No. 7,872,767, titled "Parallel Printing System"; U.S. Pat. No. 7,161,705, titled "Parallel Printing System Having Modes For Auto-Recovery, Auto-Discovery Of Resources, And Parallel Processing Of Unprotected Postscript Jobs"; and U.S. Pat. No. 6,817,791, titled "Idiom Recognizing Document Splitter"; and also may be found in U.S. Patent Application Publication Nos. 2004/0196497, titled "Parallel Printing System Having Flow Control In A Virtual Disk Transfer System"; 2009/0161163, titled "Parallel RIP With Preamble Caching", and 2010/0290080, titled "Resource Partitioning In A Print System," each of these incorporated herein by reference in their entirety.

The present disclosure proposes using a minimally interpreting postscript splitter 110 that maintains knowledge of what information has already been sent to each of multiple RIPs 113 and avoids sending redundant information to the RIPs 113. The system 500 also includes a virtual disk system 111 that allows the RIPs 113 to begin interpreting their content before all data for a job (or chunk thereof) has been sent. The splitter 110 of the present disclosure is capable of interpreting PostScript, while doing no imaging, maintaining only as much state as necessary to perform its job. Where possible the splitter 110 completely avoids interpreting portions of the input stream, only checking whether the portions are the same as the previously seen portions. Lazy evaluation is also used where possible to defer processing the portions of the input stream that might not be used immediately.

Referring to FIGS. 1 and 3, when a print job arrives 200 from a client at job submission/printer management node 100, the input spooling system (not shown) saves 202 the content either in memory or on disk 102. The system 500 determines 204 input language of the received print job.

Input language may include PostScript, VIPP and any other Turing Complete language. That is, the aspects of this present disclosure are applicable to any page description language which is Turing Complete. In the parlance of computer programming languages, a language is said to be Turing Complete if it provides the means of expression for input, output, conditional branching, and (essentially) unbounded numbers of stored variables. A Turing Complete programming language is sufficient for expressing any computer program.

In general, a page description language (PDL) is a language which allows the appearance of a printed page (such as how to form the type and graphic elements on it) to be described in a high-level, device-independent way. Rather than download a font to the printer, for example, the PDL gives the printer instructions on how to draw each character from outlines; graphics are produced in a similar way.

In a Turing Complete page description language, programming instructions are interpreted in order to indicate the page boundaries of the print job.

PostScript is unusual among page description languages. While interpreting DSC comments and PDF format requires only a simple stack-based interpreter, interpreting PostScript requires a much more complete implementation. In the language of the Chomsky hierarchy, PostScript is Turing Complete. That is, PostScript programs require arbitrarily much state, require the evaluation of conditions, and provide access to a file system (read and write).

The received print job includes objects described in a page description language. Objects may include complete descriptions of fonts, placement, size and font information for characters, groups of one or more graphical commands and pixel data defining images. Objects may include groups of other objects. In general, the term object is used here in the same sense as it is used in the description of Adobe's Portable Document Format (PDF).

The system 500 includes a processing manager assembly having a Job manager node 104, a supervisor node 106 and a task manager node 108.

The input spooling system notifies 206 the processing manager assembly for effecting the necessary supervisory functions. For example, the input spooling system informs the job manager node 104 of the input language. The job size (if it has been fully received), and how/where to find the data is also determined 204. Any of several well-known mechanisms may be used to communicate the location of the data, including a network filename for a distributed system, or a memory address for a centralized system.

The job manager node 104 is configured to communicate status information of the print job to the supervisor node 106. That is, as the job manager node 104 is informed of the print jobs it informs the supervisor node 106, which provides the splitter 110 with "chunk destinations," that is, the identities of the RIPs to receive chunks.

The supervisor node 106 is configured to maintain connections to the other parts (e.g., input spooling system, job manager node 104, RIPs 113, splitter 110, collector 112, task manager 108) of the system 500 to monitor the progress of the print job and for scheduling events. In one embodiment, the splitter of the present application may be configured to split non-DSC-conformant PostScript documents as well.

The supervisory node 106 selects 206 the splitter 110 using the determined input language. Although not shown in FIG. 1, the system 500 may include multiple splitters, one per input language being handled. For example, the system 500 may include a splitter that is capable of splitting VIPP database mode jobs, another splitter that is capable of splitting PDF documents, and yet another splitter that is capable of splitting DSC conformant PostScript documents. Each splitter may be dedicated to a specific language.

Also, the system 500 may include more than one splitter capable of handling the same input language, in order to increase the number of jobs that may be simultaneously handled. That is, a plurality of splitters is intended in a large system, in which the supervisor 106 selects a splitter based on the estimated amount of pending work on all splitters' queues.

The supervisory node 106 informs 208 the selected splitter 110 where to find the data (i.e., the supervisor node 106 does not look at the data), and the splitter 110 may begin splitting the file as soon as it is ready. The supervisor node 106 also informs the splitter 110 of the chunk parameters comprising the defining threshold boundaries of a chunk (e.g., minimum page count, minimum byte count).

The splitter 110 is configured to combine 211 the plurality of short or small document jobs to form 212 a plurality of chunks. When a large number of small document jobs are received by the page parallel printing system 500, the short or small document jobs are intelligently concatenated or combined using the splitter (also called a "reversible splitter") 110 in a way that they appear to be one large print job to the page parallel printing system 500. Specifically, once a queue full of small document jobs is received, the jobs are sent to the "reversible splitter" or splitter 110. The splitter 110 takes the job stream and joins small document jobs together to form a large print job. The splitter 110 then splits the large print job and outputs right-sized chunks to the parallel RIPs. That is, the system of the present disclosure maintains a small job nature upstream of the splitter, but the behavior would be the same as a large print job downstream of the splitter. The reversible splitter is configured to operate as a normal interpreting splitter if only one document job is sent to the splitter.

The tasks of joining small document jobs and subsequently splitting the resulting large print job may be combined into one operation. In such an embodiment, small document jobs are successively added to the current job, until the chunk size is met or exceeded. Once the resulting job meets or exceeds the chunk size constraint, the resulting job is split, if necessary, into two or more chunks, each falling within the chunking constraints. When the last chunk of the resulting job is smaller than the chunking constraints, one or more additional jobs are concatenated to it, and the cycle continues.

The system 500 further includes a user interface which enables a user to select the received short document jobs to be combined. That is, the user interface is configured to enable a user to select a specific document job set to be sent to the splitter. The user interface may be a graphical user interface (GUI). Such a graphical user interface has the characteristic that a user may interact with the system using a cursor control device and/or via a touch-screen display, rather than solely via keyboard input device. The user may simply select (using an input device, such as, a mouse of the user interface) short document jobs to be combined. In another embodiment, the user selection may be based on a predefined threshold. In one embodiment, the predefined threshold is minimum number of print jobs to be combined. In such an embodiment, a processor may be used to monitor a job queue and to initiate the combining feature when the minimum job number is exceeded.

In another embodiment, when the PDL type document jobs allow easy determination of document page count (as is the case for PDF or DSC PostScript), the predefined threshold is minimum number of pages needed in a combined print job. In such an embodiment, the processor may be configured to monitor a job queue and to initiate the combining feature when the minimum page count number is exceeded.

The splitter 110 is configured to split the print job into a plurality of chunks and to send the chunks of the job to the plurality of the RIPs for processing. The splitter 110 of the present disclosure, rather than relying on DSC comments, interprets the PostScript (programming instructions) to indicate page boundaries.

The splitter 110 splits 212 the job into chunks. The splitter 110 interprets 213 the print job to determine the objects required by each of the plurality of the RIPs to process corresponding received chunks and stores the determined objects to maintain knowledge of the determined objects. That is, the splitter 110 maintains 215 knowledge of what information has already been sent to each of multiple RIPs 113 so as to avoid sending redundant information to the RIPs 113.

Specifically, as the splitter 110 reads the PostScript input it records any objects that are defined in the current page, and accumulates a list of previously-defined objects that are required to construct a page. When the splitter 110 encounters an operator that causes a page to be output (showpage or copypage, which are possibly embedded within a procedure call), the splitter 110 transmits copies of the accumulated list of previously-defined objects to the destination RIP. The splitter 110 records, with the objects in its memory, which RIPs now have the objects, and keeps track of versions of the objects, in case the objects change as the job progresses, so that the objects may be changed as needed before these objects are used again. The splitter 110 may construct the objects as needed, possibly in a more compact form than when the objects were read in (such as the PostScript Binary Object Format), or it may simply copy sections of the input to the output unchanged.

The splitter 110 requests chunk destinations. The supervisor node 106 assigns 210 chunks to RIP nodes.

At each page boundary the splitter 110 checks whether the page count or byte count has been exceeded, and if either one has, the splitter 110 finishes that chunk. As the splitter 110 splits 212 a job into chunks, it sends the chunk to the next destination RIP it has received from the supervisor 106. The splitter 110 writes the chunk into either the memory or the disk associated with the node of the destination RIP. In one embodiment, the data for a chunk is written into the memory, rather than disk.

The splitter 110 sends 214 the determined objects along with the corresponding chunks to the designated RIPs to process the corresponding chunks, if the same determined objects are not already with the designated RIPs.

The RIP node 113 contains some state information in which various objects are resident. Those objects that do not already reside within that RIP's state information are transmitted before they are needed, but not necessarily at the start of a chunk. Although not shown in FIG. 1, the system 500 includes a plurality of RIPs 113 for parallel processing of the print job into a printer-ready format for the printing of the print job.

The splitter 110 transfers the chunks to the virtual disk 111 and the RIP 113 receives the chunk from the virtual disk 111. Details of the virtual disk are described in detail, for example, in U.S. Pat. No. 7,872,767, titled "Parallel Printing System," which is incorporated herein by reference in its entirety. It is a feature of the virtual disk 111 that when the splitter 110 has not closed a file, and the RIP 113 attempts to read beyond the end of file, the RIP 113 is blocked until more data is available or the splitter 110 closes the file. This is in contrast to a normal disk system in which readers (RIPs) that read beyond end of file encounter End Of File, regardless of whether the writer (splitter) may have more to write.

After the splitter 110 writes the first page of a chunk, it notifies the supervisor 106, which, in turn, notifies the RIP node 113.

When the splitter 110 reaches the end of a chunk, that being the first page boundary after a fixed number of bytes or pages, the splitter 110 notifies the supervisor 106, but it does not close the file in the virtual disk 111. When the supervisor 106 receives the end of chunk notification message (including which pages have been written) from the splitter 110, the supervisor 106 informs 220 the collector 112 of which pages to associate with a given chunk. The collector 112 maintains 216 a set of jobs in the system, and for each job, a list of chunks in order of arrival.

When the splitter 110 encounters 228 the end of a job, the splitter 110 closes all of the files associated with active chunks. In order to allow the supervisor 106 to continue scheduling chunks appropriately, the splitter 110 informs the supervisor 106 of the number of pages and their identities (if they are not contiguous). When the supervisor 106 receives the end of job notification message from the splitter 110, the supervisor 106 informs the collector 112 to expect no more new chunks for that job.

After the splitter has written several chunks, multiple parallel RIP nodes 113 operate in parallel, writing pages of print ready data. Preferably this data is written in compressed form, such as mixed raster content files, to internal memory data buffers.

As RIPs 113 complete processing their chunks they write their output (i.e., print ready data) to an output destination 117. The output destination 117 may be a hard disk, a virtual disk, or a buffer of memory directly readable by a printing system. The RIPs 113 then notify the supervisor node 106, which uses that information to inform the collector 112, and to maintain a model of how long chunks take to be processed. The supervisor 106 also collaborates with the collector 112 to determine when chunks have completed and uses that information to assign new chunk destinations.

The compressed output pages for the completed output job are returned to printer management 100 for transmission to a print engine.

As a RIP node completes a chunk, it sends 224 a message to the supervisor 106, which passes the message onto the collector 112. The collector 112 notes that this chunk is complete, and as long as it finds the first in the list for this job is complete, it removes the first in the list, and informs the supervisor 106. The supervisor 106 notifies the input spooling system of the location of the output data for that chunk.

When the collector 112 receives the last message from the supervisor 106 that a RIP node has completed a chunk, it knows it because that job has an associated end-of-job message, and the list of chunks becomes empty when that chunk is removed from the list. The collector 112 then informs 230 the supervisor 106, which informs the input spooling system 102 that the job is complete.

The system 500 of the present disclosure allows RIPs to retain information about the determined objects being sent to it across chunks (but not across the jobs). That is, the RIP retains the information about the determined objects (being sent to the RIP) until it completes all the chunks of the job.

Once the RIP node completes the job, the RIP removes the information about the determined objects of the job from its memory.

The collector 112 sorts notification messages and returns them to the supervisor node 106 in order, sorted by page number within job. That is, the collector 112 is configured to serialize chunk complete messages and to maintain a collection of node addresses to which chunks of each job being processed have been sent so that triggering the removal of the corresponding objects when the job is completely processed.

The splitter 110 of the present disclosure is faster than a normal PostScript interpreter for at least the following reasons. First, the splitter 110 is capable of interpreting PostScript, while doing no imaging and maintaining only as much state as necessary to perform its job. By not actually rasterizing any of the objects, the splitter 110 is much faster on documents that require a large amount of work in rasterizing the objects.

Also, as noted above, the system of the present disclosure transfers any particular object only once per RIP (or less), thus making it substantially faster for jobs in which large amounts of data are to be transferred.

Another feature that makes this splitter 110 fast is that the splitter 110 writes to the virtual disk 111, thereby reducing its I/O time substantially.

Yet another feature that makes the splitter 110 faster is the ability to identify portions of the print job that it has "seen before." The splitter 110 is configured to identify portions of the print job to check if such portions have been encountered earlier in the current print job or in a prior print job so as to use cached results of the portions of the print job from the previous instance to process the identified portion of the job.

Where possible the splitter 110 completely avoids interpreting portions of the input stream, only checking whether the portions of the input stream are the same as previously seen portions. This includes fonts, procedures, and the like, which the splitter 110 has encountered earlier in the current job or even in a prior job. These portions are identified by locating key markers and then comparing them to the previously seen portion. The comparison may involve a checksum to reduce time comparing similar but different portions. If the checksums do not match, the portion has not truly been seen before. If the checksums match, a more complete comparison may be made. Once the comparison is complete, the splitter 110 uses cached results from the previous instance, in which changes to the stacks and graphics state are remembered, and only those changes are applied.

One example of portions that may have been seen before is fonts. PostScript masters exist that contain multiple copies of the same embedded font. The splitter 110 caches each font as it is encountered and detects a subsequent embedding of a cached font. The splitter 110 then uses the cached, already interpreted, version of the font and skips the subsequent embeddings, avoiding re-interpretation.

Yet another feature that makes the splitter of the present disclosure faster is deferred (lazy) evaluation. The splitter 110 is configured to interpret the determined objects based on the deferred evaluation scheme, where the interpretation of the determined objects is deferred until the interpretation of the determined objects is actually needed to process the chunks having such objects. The deferred evaluation scheme is useful when a determined object is expensive to interpret or may not need to be interpreted at all to process the chunk having such object.

Lazy evaluation is used by the splitter 110 where possible to avoid processing the portions of the input stream that might not be used. Lazy evaluation is used by the splitter 110, for example, when rendering characters into the page. This deferred evaluation is applied in various places, including in the show operator. The show operator, and several related operators, remove a string from the stack and, using the current position, paint that string on the page in the current font and the current color, updating the current position by the width of the string. It is possible, but uncommon, that the document will depend on the updated position in such a way that a non-imaging interpreter needs to update the position in order to get later processing right. But in order to update the position, it needs to interpret the font far enough to extract the font metrics (which give the widths of the characters), and then traverse the string, adding the displacements of each of the characters together to obtain the new position. If the new position is never used (except possibly for starting the next show), the new position does not need to be calculated, the font metrics are not needed, and the font need not be interpreted. So all of these processing procedures are deferred until the splitter 110 determines that they are needed.

Another form of deferred evaluation is encoded strings. PostScript allows strings to be in one of several formats, most of which needs to be converted to binary if used in a complete interpretation. For example, hex encoding allows a string of the form <7F403D2C> which represents 4 bytes, in hex. Substantial work is required to convert this to binary, and depending on how the string is used (it may, for example, be only copied out to a RIP), that work may be deferred until it is known that the string is needed.

Deferred evaluation may also applied to clipping. In Postscript, when a set of instructions is processed to define a new clipper, a clipping path of the new clipper often intersects with the existing clipping path. The operation of intersecting the clipping paths is rather expensive and the graphics and characters as a result of this operation may sometimes be not used later. Only in rare cases will the clipping path be needed to determine which objects belong to which page. In the common case, the splitter 110 of the present disclosure simply keeps track of all the clipping paths and defers the intersection operation until it is known that such intersection is needed. The clipping operation information is transmitted to the RIPs requiring it, and they use it to clip the objects they are painting on their respective pages, but the splitter does not normally use the clipping information directly.

A possible additional feature is the characterization of user-defined procedures in terms of number and types of inputs and outputs, as well as possible side-effects. If the number and types of inputs and outputs is constant, and the lazy evaluation system shows that no data relevant to the splitter depends upon the possible side-effects, then the execution of the user-defined procedure may be skipped altogether.

In the event that the splitter encounters loop or conditional instructions in the PostScript stream, the splitter determines whether the body of the loop (which is a procedure) or the conditionally executed procedures can cause a page boundary under some or all conditions. In simple cases, such as a loop that contains only imaging operations with no side effects, and no page boundaries, the loop is transmitted to the corresponding RIP. In complex cases, such as a loop or other control structure that causes the interpreter state to change, the splitter executes the loop or other control structure and determines the changes to the interpreter state. In this manner the interpreter is capable of handling page descriptions that exploit the full Turing Complete nature of the PostScript language.

Thus, the present disclosure provides a system and a method having a splitter and multiple RIPs, in which the splitter interprets enough of the input to determine what data is required for each of the multiple RIPs and transmits the required data (i.e., only that information which is new to that RIP) to that RIP. The splitter is also capable of interpreting a language that is Turing complete. In addition, the splitter uses deferred evaluation scheme and uses cached results of previously interpreted code segments, when interpreting the input. The system of the present disclosure also allows RIPs to retain information across chunks (but not across jobs). The present disclosure provides a fast method to post-process Postscript data for many applications, like splitting for page parallel RIPing, splitting for color and black and white, dynamic modification of content by inserting security elements, etc.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A parallel Raster Image Processor system comprising:
a plurality of Raster Image Processors (RIPs) for parallel processing of a plurality of print jobs into a printer-ready format for printing of the print jobs, wherein at least one print job comprises objects described in a Turing Complete page description language in which programming instructions are interpreted so as to indicate page boundaries of the print job, and wherein at least one of the objects includes a description, in the Turing complete page description language of a font, placement size and font information for one or more characters, a group of one or more graphical commands, or pixel data defining an image in the print job; and
a splitter for combining the plurality of print jobs in a print queue into a single print job and splitting the print job, which is comprised of the combined plurality of print jobs, into a plurality of chunks and sending the chunks of the print job to the plurality of the RIPs for processing, wherein the splitter is configured to:
interpret the descriptions, in the Turing complete page description language, in the print job enough to determine the objects required by each of the plurality of the RIPs to process each corresponding chunk sent to that RIP;
store the determined objects to maintain knowledge of the determined objects, the knowledge comprising information about which determined objects were sent to which designated RIP for processing the corresponding chunk; and
send each chunk to the designated RIP for processing and send the determined objects required to process the corresponding chunk to the designated RIP for processing the corresponding chunk, if the same determined objects are not already with the designated RIP,
wherein the splitter is configured to interpret the print job without relying on comments conforming to Document Structuring Convention (DSC).

2. The system of claim 1, wherein the splitter is configured to store changed versions of the determined objects as the print job is being processed.

3. The system of claim 1, wherein the splitter is configured to interpret the determined objects based on a deferred evaluation scheme, wherein the interpretation of the determined objects is deferred until the interpretation of the determined objects is actually needed to process the chunks having such objects.

4. The system of claim 3, wherein the deferred evaluation scheme is applied to encoded strings, wherein the splitter is configured to defer interpretation of the encoded strings until the interpretation is actually needed to process the chunks.

5. The system of claim 3, wherein the deferred evaluation scheme is applied to clipping, wherein the splitter is configured to keep track of all clipping paths and to defer an operation of intersecting the clipping paths until it is known that such an intersection operation is needed to process the chunks.

6. The system of claim 3, the deferred evaluation scheme is applied to a show operator.

7. The system of claim 1, wherein the splitter is configured to identify portions of the print job to determine if such portions have been encountered earlier in the current print job or in a prior print job so as to use cached results of the portions of the print job from a previous instance to process the identified portion of the print job.

8. A method of operating a printing system for parallel processing of a plurality of print jobs with a plurality of Raster Image Processors (RIPs) into a printer-ready format for printing of the print jobs, wherein the method is implemented in a computer system comprising one or more processors configured to execute one or more computer program modules, the method comprising:
combining, using a splitter, the plurality of print jobs in a print queue into a single print job, and splitting, using the splitter, the print job, which is comprised of the combined plurality of print jobs, into a plurality of chunks and sending the chunks of the print job to the plurality of the RIPs for processing, wherein at least one of the plurality of print jobs comprises objects described in a Turing Complete page description language in which programming instructions are interpreted so as to indicate page boundaries of the print job, and wherein at least one of the objects includes a description, in the Turing complete page description language of a font, placement size and font information for one or more characters, a group of one or more graphical commands, or pixel data defining an image in the print job;
interpreting, using the splitter, the descriptions, in the Turing complete page description language, in the print job enough to determine the objects required by each of the plurality of the RIPs to process each corresponding chunk sent to that RIP;
storing the determined objects to maintain knowledge of the determined objects, the knowledge comprising information about which determined objects were sent to which designated RIP for processing the corresponding chunk; and
sending each chunk to the designated RIP for processing and sending the determined objects required to process the corresponding chunk to the designated RIP for processing the corresponding chunk, if the same determined objects are not already with the designated RIP,
wherein the splitter is configured to interpret the print job without relying on comments conforming to Document Structuring Convention (DSC).

9. The method of claim 8, further comprising storing changed versions of the determined objects as the print job is being processed.

10. The method of claim 8, further comprising interpreting, using the splitter, the determined objects based on a deferred evaluation scheme, wherein the interpretation of the determined objects is deferred until the interpretation of the determined objects is actually needed to process the chunks having such objects.

11. The method of claim 10, wherein the deferred evaluation scheme is applied to clipping, show operator, and encoded strings.

12. The method of claim 8, further comprising identifying portions of the print job to determine if such portions have been encountered earlier in the current print job or in a prior print job so as to use cached results of the portions of the print job from a previous instance to process the identified portion of the print job.

13. A splitter device configured to:
combine a plurality of print jobs in a print queue into a single print job and split the print job which is comprised of the combined plurality of print jobs into a plurality of chunks, the print job comprising objects described in a page description language;
interpret descriptions, in a Turing complete page description language, in the print job enough to determine the objects required by each of a plurality of RIPs to process each corresponding chunk sent to that RIP;
store the determined objects to maintain knowledge of the determined objects, the knowledge comprising information about which determined objects were sent to which designated RIP for processing the corresponding chunk; and
send each chunk to the designated RIP for processing and send the determined objects required to process the corresponding chunk to the designated RIP for processing the corresponding chunk, if the same determined objects are not already with the designated RIP,
wherein the objects in at least one of the plurality of print jobs are described in the Turing Complete page description language in which programming instructions are interpreted so as to indicate page boundaries of the print job, and wherein at least one of the objects includes a description, in the Turing complete page description language of a font, placement size and font information for one or more characters, a group of one or more graphical commands, or pixel data defining an image in the print job,
wherein the splitter device is configured to interpret the print job without relying on comments conforming to Document Structuring Convention (DSC).

14. The splitter device of claim 13, wherein the splitter device is configured to store changed versions of the determined objects as the print job is being processed.

15. The splitter device of claim 13, wherein the splitter device is configured to interpret the determined objects based on a deferred evaluation scheme, wherein the interpretation of the determined objects is deferred until the interpretation of the determined objects is actually needed to process the chunks having such objects.

16. The splitter device of claim 15, wherein the deferred evaluation scheme is applied to clipping, show operator, and encoded strings.

17. The splitter device of claim 13, wherein the splitter device is configured to identify portions of the print job to determine if such portions have been encountered earlier in the current print job or in a prior print job so as to use cached results of the portions of the print job from a previous instance to process the identified portion of the print job.

18. The splitter device of claim 13, wherein the splitter device is configured to split the print job that is not conforming to the Document Structuring Convention (DSC).

19. The method of claim 8, wherein the splitter is configured to split the print job that is not conforming to the Document Structuring Convention (DSC).

20. The system of claim 1, wherein the splitter is configured to split the print job that is not conforming to the Document Structuring Convention (DSC).

* * * * *